(12) United States Patent
Kotake et al.

(10) Patent No.: US 10,738,137 B2
(45) Date of Patent: Aug. 11, 2020

(54) REACTOR

(71) Applicant: Kureha Corporation, Tokyo (JP)

(72) Inventors: Tomoya Kotake, Tokyo (JP); Noriyuki Yoshio, Tokyo (JP); Shuhei Nishiyama, Tokyo (JP); Misato Matsuoka, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 16/653,723

(22) Filed: Oct. 15, 2019

(65) Prior Publication Data

US 2020/0040111 A1 Feb. 6, 2020

Related U.S. Application Data

(63) Continuation of application No. 16/392,728, filed on Apr. 24, 2019, now abandoned.

(30) Foreign Application Priority Data

Jul. 18, 2018 (JP) ................................ 2018-134916

(51) Int. Cl.
*C08F 2/01* (2006.01)
*B01J 19/00* (2006.01)
(Continued)

(52) U.S. Cl.
CPC .............. *C08F 2/01* (2013.01); *B01F 7/1625* (2013.01); *B01F 7/1675* (2013.01); *B01J 19/006* (2013.01); *B01J 19/0013* (2013.01); *B01J 19/0066* (2013.01); *B01J 19/1806* (2013.01); *C08L 81/02* (2013.01); *B01J 2219/00081* (2013.01); *B01J 2219/00085* (2013.01);
(Continued)

(58) Field of Classification Search
CPC ........ C08F 2/01; B01J 19/006; B01J 19/0066; B01J 19/0013; B01J 19/1806; B01J 2219/00081; B01J 2219/00083; B01J 2219/00085; B01J 2219/00765; B01J 2219/00768; B01J 2219/1943
See application file for complete search history.

(56) References Cited

U.S. PATENT DOCUMENTS 2,085,924 A 7/1937 Riegler
5,472,278 A 12/1995 Kawaoka et al.
2017/0313790 A1* 11/2017 Yokoyama .............. C08F 2/001

FOREIGN PATENT DOCUMENTS

JP 2003238605 A 8/2003

OTHER PUBLICATIONS

Machine Translation of JP2003238605 (Year: 2003).*

* cited by examiner

*Primary Examiner* — Lessanework Seifu
(74) *Attorney, Agent, or Firm* — Abel Schillinger, LLP

(57) ABSTRACT

A polymerization device that includes: a reaction vessel that houses a polymerization solution and in which a polymerization reaction is performed; a stirring blade that stirs the polymerization solution housed in the reaction vessel; a plurality of heat transfer pipes that transfer heat to the polymerization solution in order to start the polymerization reaction and cause the polymerization reaction to proceed, and that remove, from the polymerization solution, heat generated by the polymerization reaction; and a baffle arranged between a vessel wall of the reaction vessel and the heat transfer pipes.

8 Claims, 5 Drawing Sheets

(51) Int. Cl.
    *B01J 19/18*     (2006.01)
    *B01F 7/16*     (2006.01)
    *C08L 81/02*     (2006.01)

(52) U.S. Cl.
    CPC ................ *B01J 2219/00765* (2013.01); *B01J 2219/1943* (2013.01)

REACTOR

CROSS-REFERENCE TO RELATED APPLICATIONS

This application is a continuation of and claims priority to U.S. patent application Ser. No. 16/392,728 entitled "Reactor," by Tomoya KOTAKE et al., filed Apr. 24, 2019, which claims the benefit of Japanese Patent Application No. 2018-134916 filed Jul. 18, 2018, of which both applications are herein incorporated by reference in their entireties.

TECHNICAL FIELD

The present invention relates to a reactor.

BACKGROUND ART

A reactor is known that is used for producing polymers and that has a stirring blade and a heat transfer pipe.

For example, Patent Document 1 discloses a reactor that enables mixing in a shorter time as a result of improving a mixing performance by adjusting a shape and arrangement of a stirring blade, and enables cooling in a shorter time as a result of improving a heat removal performance by using a hairpin coil baffle as the heat transfer pipe. According to Patent Document 1, improving the mixing performance of the above described reactor can prevent the occurrence of gelatinous materials resulting from the adhesion of a polymer to vessel walls, coils and the like, and can thus reduce appearance defects, printing defects, and the like of a molded article caused by these gelatinous materials. Furthermore, according to Patent Document 1, as a result of enabling the cooling in a shorter time by improving the heat removal performance, the above described reactor can reduce unexpected deactivation and bonding of an activated terminal, and can stabilize the quality of the produced polymer.

CITATION LIST

Patent Literature

Patent Document 1: JP 2003-238605 A

SUMMARY OF INVENTION

Technical Problem

As disclosed in Patent Document 1, the reactor requires a high mixing performance and heat exchange (heating and heat removal) performance. In particular, when it is attempted to cause a reaction raw material to have a high concentration in order to improve a polymer yield, the amount of heat produced also increases during polymerization. Thus, it is necessary to further improve the heat removal performance in order to prevent a runaway reaction caused by insufficient heat removal.

As a method for improving the heat removal performance, a method is conceivable in which the number of heat transfer pipes is increased, and a heating surface area of the heat transfer pipes is enlarged. However, when the number of heat transfer pipes is increased and the heating surface area is enlarged, a practical volume is reduced and a preparation quantity for each batch is lowered. Thus, it may actually be difficult to increase the yield. In contrast to this, the heat transfer pipes having the hairpin coil shape as disclosed in Patent Document 1 enable the heating surface area to be enlarged while reducing a diameter of the heat transfer pipes and preventing the reduction in the practical volume.

Meanwhile, the heat transfer pipes provided in the reactor also operate as a baffle for converting a polymerization solution rotatingly flowing in a circumferential direction into a vertically circulating flow. Furthermore, the heat transfer pipes are normally arranged in a circumferential layout around the stirring blade. Thus, when the number of heat transfer pipes is increased in order to enlarge the heating surface area, inside a reaction vessel, the circulation of the polymerization solution between the inner side relative to the heat transfer pipe and the outer side relative to the heat transfer pipe is restricted, and the mixing performance may actually deteriorate. According to knowledge of the present inventor, particularly when the reaction raw material has a high concentration, even when using the heat transfer pipes that have the reduced diameter and the hairpin coil shape, it is necessary to arrange even more of the heat transfer pipes in order to prevent the runaway reaction caused by the insufficient heat removal, and thus, the deterioration of the mixing performance caused by the above described restriction on the circulation of the polymerization solution can notably occur.

In light of the foregoing, an object of the present invention is to provide a reactor capable of reducing a deterioration in a mixing performance of a polymerization solution while increasing the number of heat transfer pipes.

Solution to Problem

A reactor of the present invention to solve the above described problems includes: a reaction vessel that houses a polymerization solution and in which a polymerization reaction is performed; a stirring blade that stirs the polymerization solution housed in the reaction vessel; a plurality of heat transfer pipes that transfer heat to the polymerization solution in order to start the polymerization reaction and cause the polymerization reaction to proceed, and removes, from the polymerization solution, heat generated by the polymerization reaction; and a baffle arranged between a vessel wall of the reaction vessel and the heat transfer pipes. The plurality of heat transfer pipes are arranged in a circumferential shape around the stirring blade, include heat transfer pipes whose lower ends are arranged in a position higher than a bottom face of the reaction vessel, and restrict the amount of the polymerization solution circulated from an inner side to a vessel wall side of the reaction vessel, at a depth at which the heat transfer pipes are arranged. The baffle changes a flow direction of the polymerization solution that has flowed between the vessel wall of the reaction vessel and the heat transfer pipes arranged in the circumferential shape, and generates a flow of the polymerization solution to an inward direction of the reaction vessel.

Advantageous Effects of Invention

According to the present invention, a reactor is provided that is capable of reducing a deterioration in a mixing performance of a polymerization solution while increasing the number of heat transfer pipes.

DESCRIPTION OF EMBODIMENTS

Figure 1:
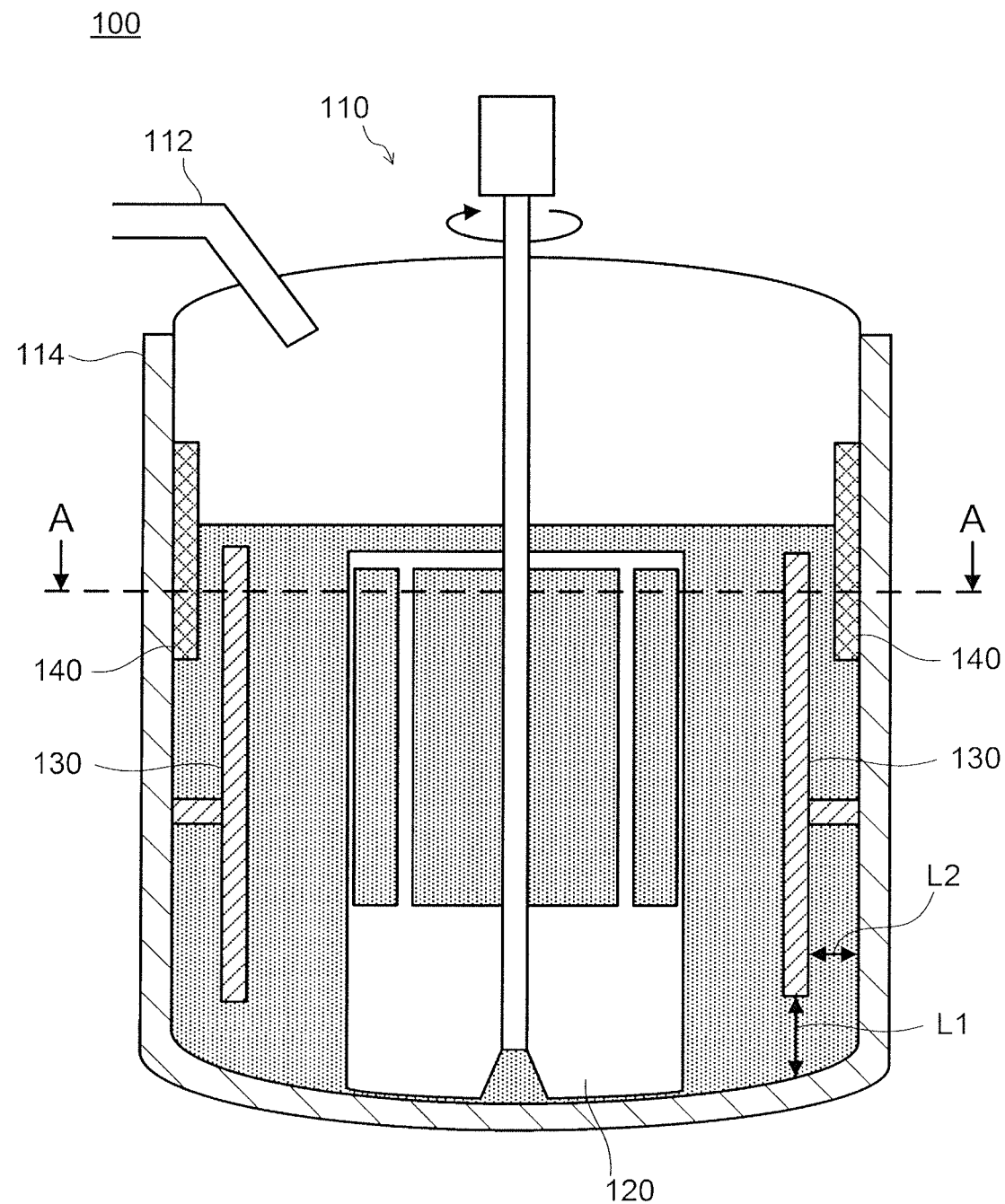
FIG. 1 is a cross-sectional view of a reactor according to an embodiment of the present invention including a reaction vessel that has a substantially cylindrical long trunk portion, when cut along the vertical direction of a plane that passes through the central axis of the reaction vessel.
Figure 2:
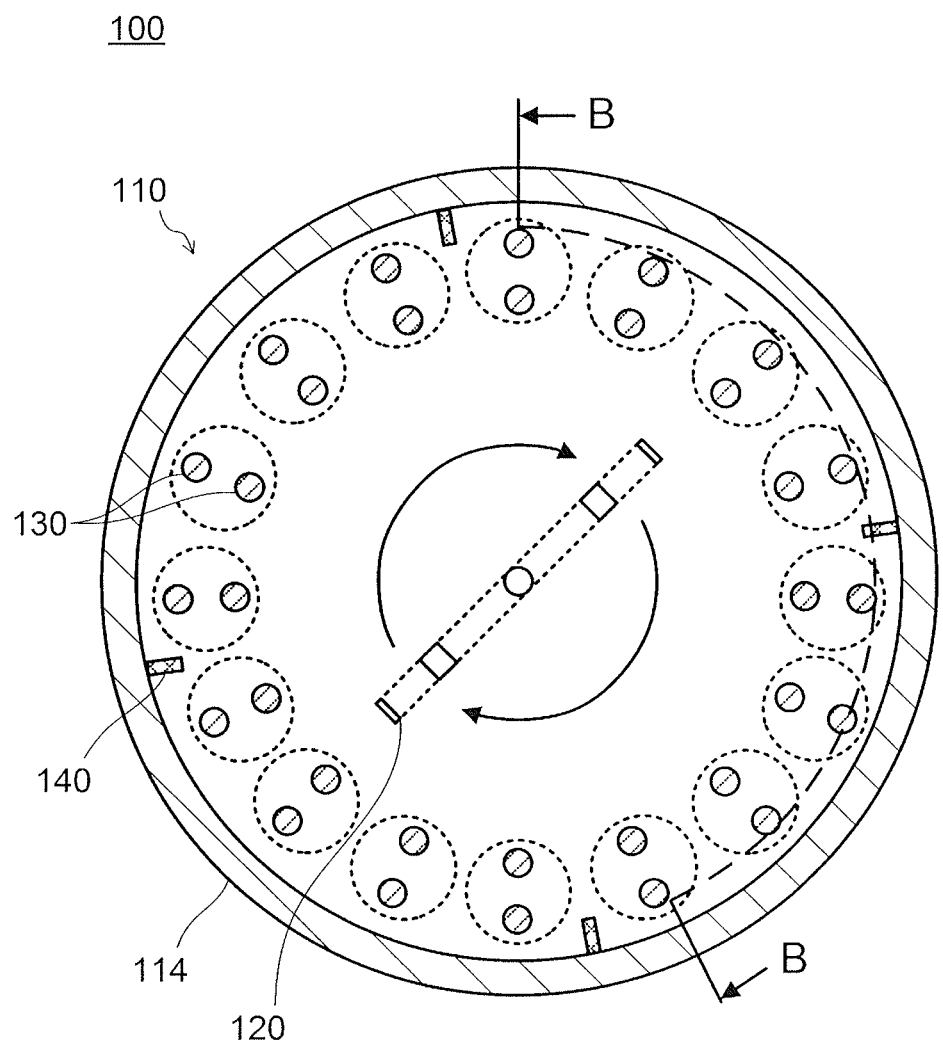
FIG. 2 is a cross-sectional view of the reactor according to an embodiment of the present invention when cut in a horizontal direction along a dotted line A-A illustrated in FIG. 1.

FIG. 1 and FIG. 2 are cross-sectional views schematically illustrating the configuration of a reactor 100 according to an embodiment of the present invention. FIG. 1 is a cross-sectional view of the reactor 100 including a substantially cylindrical reaction vessel, when the reactor is cut along the vertical direction of a plane that passes through a central axis of the reaction vessel. FIG. 2 is a cross-sectional view when the reactor 100 is cut in the horizontal direction along a dotted line A-A illustrated in FIG. 1.

The reactor 100 includes a reaction vessel 110, a stirring blade 120, a plurality of heat transfer pipes 130, and baffles 140.

The reaction vessel 110 houses a polymerization solution, and causes a polymerization reaction therein. The reaction vessel 110 is a container, for example, in which a substantially hemispherical lower lid is attached to one end of a cylindrical long trunk portion, and a substantially hemispherical upper lid is attached to the other end of the long trunk portion such that the upper lid is able to open and close. The reaction vessel 110 can be a known reaction vessel used for a polymerization reaction that has one or more supply ports 112 for supplying a polymerization solution or a material thereof into the interior of the reaction vessel 110, and a jacket 114 for adjusting a temperature of the interior of the reaction vessel 110. Note that a pump (not illustrated) may be arranged upstream of the supply port 112, and may limit a supply amount of raw material into the interior of the reaction vessel 110. Furthermore, the shape of the lower lid and the upper lid need not necessarily be substantially hemispherical, and may be an oval hemispherical shape or the like.

Note that the above described polymerization solution is a liquid or a solid-liquid system (slurry or the like) whose composition changes due to the above described polymerization reaction, and is a liquid or solid-liquid system that contains a raw material of a reaction product or the reaction product. In other words, the above described polymerization solution is a liquid that, before a start of the reaction and in initial stages of the reaction, contains a monomer that is the raw material of a polymer generated by the above described polymerization reaction, components added as necessary, such as a molecular weight modifier, a branching/cross-linking agent, and a phase separation agent, and a solvent, such as an organic solvent. Furthermore, the above described polymerization solution may be a liquid or a solid-liquid system (slurry or the like) that contains a prepolymer, which is an intermediate product generated in the liquid during the progress of the reaction, a polymer, which is a reaction product, and particles formed by granulation of the above described polymer, and the like (hereinafter, when the "reaction product" is simply referred to, this includes all of the prepolymer, the polymer, and the particles).

The stirring blade 120 stirs the polymerization solution housed inside the reaction vessel 110. The stirring blade 120 can be a known stirring blade, such as a paddle blade, a Maxblend ("Maxblend" is a trade name of Sumitomo Heavy Industries Process Equipment Co., Ltd.). Note that, when granulating the polymer inside the reaction vessel 110, for example, it is preferable to increase a circulating amount of the flow caused by stirring the polymerization solution using the stirring blade 120, and to prevent adhesion of the polymer, which is the product, and the granulated particles to the stirring blade 120, the vessel wall of the reaction vessel 110, and the like. From the point of view of reaching the above described high circulating amount using low power, the stirring blade 120 is preferably the Maxblend that has a large discharge flow rate.

The plurality of heat transfer pipes 130 heat the polymerization solution housed in the interior of the reaction vessel 110, thus causing the polymerization reaction to start and progress, while also removing the heat of polymerization, from the polymerization solution, generated by the polymerization reaction.

In order to efficiently perform the heating and heat removal, the plurality of heat transfer pipes 130 are arranged in a circumferential shape around the periphery of the stirring blade 120, at equal intervals. In order to perform sufficient heat removal and to prevent the runaway reaction when a high concentration polymerization solution is used, each of the plurality of heat transfer pipes 130 of the present embodiment preferably has the hairpin coil shape in which two of the pipes arranged in the vertical direction are coupled at end portions thereof. Heat transfer pipes having the hairpin coil shape can increase the heating surface area while minimizing a reduction in the practical volume (in FIG. 2, the two pipes illustrated inside circles indicated by dotted lines are the above described two pipes configuring the hairpin coil shape). However, when the polymerization solution is caused to have a high concentration, even the heat transfer pipes having the above described hairpin coil shape sometimes have an insufficient heat removal performance. Thus, in the present embodiment, the heat transfer pipes 130 are arranged at a higher density than in the related art. In this way, with respect to the plurality of heat transfer pipes 130, at a depth in the interior of the reaction vessel 110 at which the plurality of heat transfer pipes 130 are arranged, the amount of the polymerization solution circulated from a region on the inner side of the positions at which the heat transfer pipes 130 are arranged in the circumferential shape to a region on the outer side of the positions at which the heat transfer pipes 130 are arranged in the circumferential shape is restricted. Note that the restriction of the circulation amount of the above described polymerization solution by the plurality of heat transfer pipes 130 is particularly evident when the polymerization solution is caused to have the high concentration and when granulating the polymer inside the reaction vessel 110, for example.

The plurality of heat transfer pipes 130 are arranged at the equal intervals such that a distance between the adjacent heat transfer pipes is from 3% to 97% of a diameter of the reaction vessel 110. From the point of view of improving the heating surface area, the distance between the adjacent heat transfer pipes is preferably from 3% to 85% of the diameter of the reaction vessel 110, more preferably from 5% to 65%, and even more preferably from 10% to 50%. More specifically, for the reaction vessel 110 having a diameter of 3200 mm, when 18 hairpin coils are used, the distance between the adjacent heat transfer pipes is preferably 20% or less of the distance to the center of the reaction vessel. Note that the diameter of the reaction vessel 110 is the diameter of a circle configuring a cross-section obtained by horizontally cutting the reaction vessel 110. When the diameter of the circle configuring the above described cross-section of the reaction vessel 110 changes in the depth direction, a value of the diameter at the depth at which the above described diameter is the largest value (in the present embodiment, the diameter of the circle configuring the cross-section obtained by horizontally cutting the reaction vessel 110 at the long trunk portion) of the diameter of the reaction vessel 110. Furthermore, the above described distance between the adjacent heat transfer pipes is a shortest distance between surfaces of the heat transfer pipes, of the two heat transfer pipes arranged to be adjacent.

As illustrated in FIG. 2, in the present embodiment, the plurality of heat transfer pipes 130 that are the heat transfer pipes having the hairpin coil shape are arranged at positions at which an angle from a center axis of the reaction vessel 110 to each of the above described two pipes configuring the hairpin coil shape is the same, and distances thereto are different. In other words, the above described plurality of heat transfer pipes are arranged such that one of the above described two pipes configuring the hairpin coil shape is positioned on one of two concentric circles centered on the center axis of the reaction vessel, and the other of the above described two pipes is positioned on another of the above described concentric circles. In this way, the heat exchange between the plurality of heat transfer pipes 130 and the polymerization solution is efficiently performed. In addition, the flow of the polymerization solution is more easily disturbed by the heat transfer pipes having the hairpin coil shape, thus facilitating mixing of the polymerization solution.

Furthermore, as illustrated in FIG. 1, the plurality of heat transfer pipes 130 are arranged at positions such that the upper ends thereof are in positions lower than the liquid surface of the polymerization solution. In this way, in the vicinity of an upper end (a boundary surface) of the polymerization solution, movement of the polymerization solution between the region on the inner side and the region on the outer side of the interior of the reaction vessel 110 is easier, and miscibility of the polymerization solution can be increased. From the point of view of increasing the miscibility of the polymerization solution, the plurality of heat transfer pipes 130 are preferably arranged in positions at which the upper ends thereof are at the same height as the upper end of the stirring blade 120, or in positions at which the upper ends thereof are lower than the upper end of the stirring blade 120.

Note that, in the present embodiment, the position of the liquid surface refers to the position of the liquid surface of the polymerization solution when the polymerization solution is supplied to the interior of the reaction vessel 110 and the polymerization reaction is progressing, and the liquid level refers to the height from the bottom-most portion of the reaction vessel 110 to the liquid surface of the polymerization solution when the polymerization reaction is progressing. When the amount of liquid changes and the position of the liquid surface changes during the polymerization reaction, of the heights of the changing liquid surface, a maximum position is the "position of the liquid surface", and the height from the bottom-most portion of the reaction vessel 110 to the liquid surface at that time is the "liquid level." The position of the liquid surface is normally clearly displayed on the reaction vessel 110 in order to indicate the amount of the polymerization solution to be supplied.

Meanwhile, as illustrated in FIG. 1, the plurality of heat transfer pipes 130 include the heat transfer pipes whose length in the vertical direction is shorter than the liquid level, and whose lower ends are arranged in positions higher than a bottom surface of the reaction vessel. In this way, a gap occurs between the lower ends of the plurality of heat transfer pipes 130 and the bottom surface (the surface of the lower lid) of the reaction vessel 110, and the polymerization solution can pass through that gap and can freely circulate from the region on the inner side to the region on the outer side of the interior of the reaction vessel 110. Note that, of the plurality of heat transfer pipes 130, it is sufficient that at least one be positioned such that the lower end thereof is in the position higher than the bottom face of the reaction vessel, and the plurality of heat transfer pipes 130 may include the heat transfer pipe that extends to a lower portion than the lower lid.

When the stirring blade 120 rotates, a strong discharge flow occurs from the lower end of the stirring blade 120 to the side of the vessel wall. This strong discharge flow reaches the vessel wall of the reaction vessel 110 while passing through the above described gap between the lower ends of the plurality of heat transfer pipes 130 and the bottom face of the reaction vessel 110. After that, the discharge flow converges with a weak discharge flow circulating between the plurality of heat transfer pipes 130, and rises while revolving along the vessel wall of the reaction vessel 110 through a gap between the plurality of heat transfer pipes 130 and the vessel wall of the reaction vessel 110, thus creating the flow of the polymerization solution. Note that, the above described strong discharge flow occurs particularly notably when the stirring blade 120 is the large stirring blade, such as the Maxblend.

The flow of the polymerization solution that is rising prevents stagnation of the polymerization solution in the bottom face portion and on the vessel wall side of the reaction vessel 110, and allows the polymerization solution to be more easily mixed.

From the point of view of allowing the above described flow of the polymerization solution that rises to occur more easily and more strongly, and causing the stagnation of the above described polymerization solution to less easily occur, the plurality of heat transfer pipes 130 are preferably arranged in positions such that a distance L1 between the lower ends of the plurality of heat transfer pipes 130 and the bottom face of the reaction vessel 110 is longer than a distance L2 between the plurality of heat transfer pipes 130 and the vessel wall of the reaction vessel 110. Note that the distance L1 between the lower ends of the plurality of heat transfer pipes 130 and the bottom face of the reaction vessel 110 in a mode in which the plurality of heat transfer pipes 130 have the hairpin coil shape, as in the present embodiment, is a distance between a position on the bottom-most portion side of a coupling portion at the lower end of the heat transfer pipes having the above described hairpin coil shape and the bottom face of the reaction vessel 110. Note also that the distance L2 between the above described plurality of heat transfer pipes 130 and the vessel wall of the reaction vessel 110 in the mode in which the plurality of heat transfer pipes 130 have the hairpin coil shape, as in the present embodiment, is a distance between the surface of the pipe that is arranged on the outer side of the two pipes having the hairpin coil shape and the vessel wall of the reaction vessel 110.

The baffles 140 change a circulation direction of the polymerization solution occurring when the stirring blade 120 stirs the polymerization solution. In a cross-section when the reaction vessel 110 is cut in the horizontal direction, the baffles 140 are plate-shaped members that are arranged between a region in which the plurality of heat transfer pipes 130 are arranged in the circumferential shape and the vessel wall of the reaction vessel 110 and that extend from the vessel wall of the reaction vessel 110 in a direction toward the center of the reaction vessel 110 (an inward direction).

Of the above described flow of the polymerization solution that rises, in the vicinity of the boundary surface of the polymerization solution, a revolving flow mainly occurs, and the circulation of the polymerization solution between the outer side and the inner side is limited. In the present embodiment, the baffles 140 disturb the flow of the above described revolving flow, change a circulation direction thereof, and generate a flow drawing a flow from the outer side to the inner side of the reaction vessel 110. In this way, the baffles 140 generates the flow from the outer side to the inner side of the reaction vessel 110 in the vicinity of the boundary surface, thus boosting the generation of the circulating flow in the interior of the reaction vessel 110.

FIGS. 3A to 3F and FIGS. 4A to 4D are results of simulating the flow of the polymerization solution, using the reactor 100 according to the present embodiment, when the baffles 140 are not arranged in the reaction vessel 110 (FIG. 3A and FIG. 3B), and when four of the baffles 140 are arranged at equal intervals along the vessel wall of the reaction vessel 110 such that the upper ends thereof are at the position of the liquid surface (FIG. 3C, FIG. 3D, FIG. 3E, FIG. 3F, FIG. 4A, FIG. 4B, FIG. 4C, and FIG. 4D).

Note that the simulation was performed under the following conditions.
a. Diameter of reaction vessel: 3200 mm
b. Stirring blade: Maxblend
c. Shape of heat transfer pipe: Hairpin coil shape
d. Number of heat transfer pipes: 16
e. Distance between adjacent heat transfer pipes: 6.875% of diameter of reaction vessel
f. Coil radius: 82.6 mm
g. Number of baffles: 4
h. Content liquid (virtual polymerization solution): Water
i. FIGS. 3A to 3F and FIGS. 4A to 4D illustrate that the lighter the color of the region, the faster the flow of the polymerization solution, and the darker the color of the region, the slower the flow of the polymerization solution. Note that, FIG. 3C and FIG. 3D are the simulation results for the baffles having a height that is 20% of the liquid level, FIG. 3E and FIG. 3F are the simulation results for the baffles having a height that is 40% of the liquid level, FIG. 4A and FIG. 4B are simulation results for the baffles having a height that is 60% of the liquid level, and FIG. 4C and FIG. 4D are simulation results for the baffles having a height that is 80% of the liquid level, when the baffles are respectively arranged in contact with the liquid surface. Furthermore, FIG. 3A, FIG. 3C, FIG. 3E, FIG. 4A and FIG. 4C illustrate the flow of the polymerization solution in a cross-section (see a dotted line B-B in FIG. 2) that is cut in the vertical direction along the vessel wall of the reaction vessel 110 (the baffles 140 are illustrated in black). FIG. 3B, FIG. 3D, FIG. 3F, FIG. 4B, and FIG. 4D illustrate the flow of the polymerization solution when the liquid surface of the reaction vessel 110 is seen in a plan view (the baffles 140 are illustrated in white).

Figure 3A:
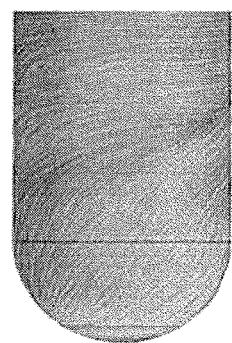
FIG. 3A and FIG. 3B are results of simulating the flow of a polymerization solution inside a reaction vessel when baffles are not arranged in the reaction vessel.
Figure 3B:
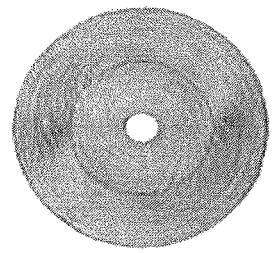
Figure 3C:
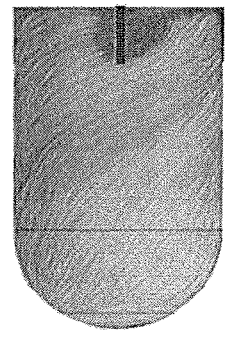
FIG. 3C and FIG. 3D are results of simulating the flow of the polymerization solution inside the reaction vessel when baffles having a height of approximately 20% of a liquid level are arranged in the reaction vessel.
Figure 3D:
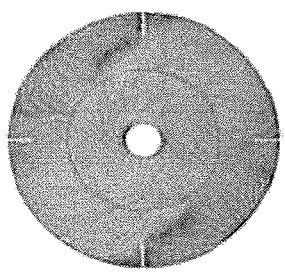
Figure 3E:
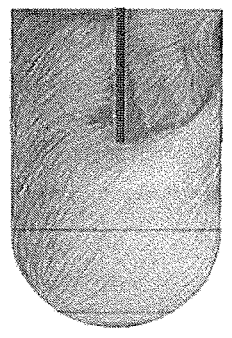
FIG. 3E and FIG. 3F are results of simulating the flow of the polymerization solution inside the reaction vessel when baffles having a height of approximately 40% of the liquid level are arranged in the reaction vessel.
Figure 3F:
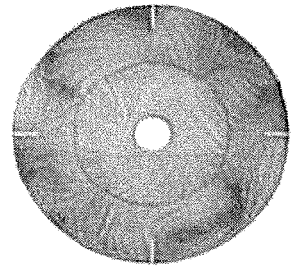
Figure 4A:
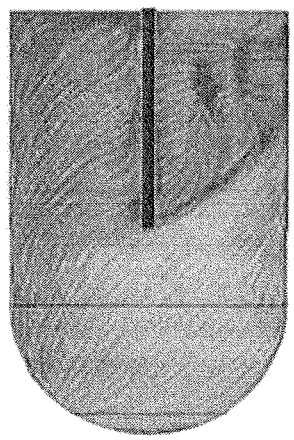
FIG. 4A and FIG. 4B are results of simulating the flow of the polymerization solution inside the reaction vessel when baffles having a height of approximately 60% of the liquid level are arranged in the reaction vessel.
Figure 4B:
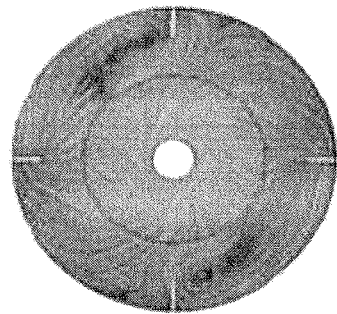
Figure 4C:
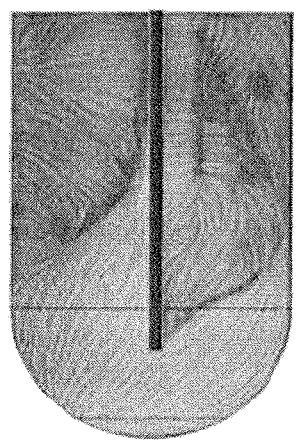
FIG. 4C and FIG. 4D are results of simulating the flow of the polymerization solution inside the reaction vessel when baffles having a height of approximately 80% of the liquid level are arranged in the reaction vessel.
Figure 4D:
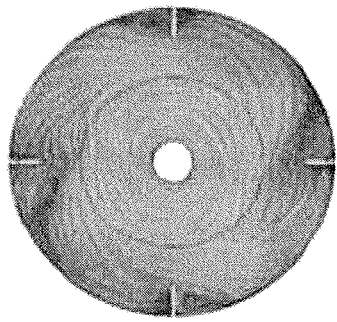

As illustrated in FIG. 3A and FIG. 3B, when the baffles 140 are not arranged, the polymerization solution is rising along the vessel wall on the bottom portion side of the reaction vessel 110, but the polymerization solution is a revolving flow in the vicinity of the boundary surface, and the flow from the outer side to the inner side of the reaction vessel 110, and the flow in the depth direction or in the boundary surface direction of the reaction vessel 110 are also limited. In contrast, arranging the baffles 140, as illustrated in FIG. 3C, FIG. 3D, FIG. 3E, FIG. 3F, FIG. 4A, FIG. 4B, FIG. 4C, and FIG. 4D generates the flow of the polymerization solution from the outer side to the inner side occurs in the vicinity of the boundary surface.

Furthermore, as clearly illustrated from a comparison of FIG. 3C and FIG. 3E, and of FIG. 4A and FIG. 4C, the greater the height of the baffles 140 (the deeper the position of the lower ends of the baffles 140), the greater a range of a stagnation portion in which the flow of the polymerization solution has become slow on a reverse side of each of the baffles 140 (the opposite side to the side with which the flow of the revolving polymerization solution comes into contact). Meanwhile, in order to generate the flow to the inner side using the baffles 140, it is necessary for the position of the lower ends of the baffles 140 to be at a certain depth. Thus, in order to increase the miscibility of the polymerization solution by causing the polymerization solution to flow sufficiently in the up and down directions on the reverse side of the baffles 140 also, it can be seen that the position of the lower ends of the baffles 140 is preferably not too deep. From this point of view, a length of a section of each of the baffles 140 that is immersed in the polymerization solution is preferably arranged in a position that is from 10% to 50% of the liquid level, and is more preferably arranged in a position that is from 10% to 30% of the liquid level.

The baffles 140 are arranged at equal intervals along the vessel wall of the reaction vessel 110. From the point of view of effectively improving the miscibility of the polymerization solution, from one to four of the baffles 140 are preferably arranged, and more preferably, from two to four of the baffles 140 are arranged in the reaction vessel 110.

Note that the baffles 140 are arranged such that the upper ends thereof are arranged at the position of the liquid surface, or are arranged at a position that is higher than the position of the liquid surface. Of these, the baffles 140 are preferably arranged such that the upper ends thereof are arranged at a position that is higher than the position of the liquid surface. When the upper ends of the baffles 140 are arranged at the position that is higher than the position of the liquid surface, the baffles 140 disturb the boundary surface of the polymerization solution, and cause the flow from the outer side to the inner side in the vicinity of the boundary surface of the polymerization solution to more easily occur. In the vicinity of the boundary surface of the polymerization solution, from the point of view of effectively causing the above described flow from the outer side to the inner side to occur, the position of the upper ends of the baffles 140 are preferably at a position that is higher than the position of the liquid surface, by an amount that is from 10% to 50% of the liquid level height above the position of the liquid surface.

An extending length of the baffles 140 from the vessel wall toward the inner direction is not particularly limited, and can be from 10% to 30% of a distance from the vessel wall to the center of the reaction vessel 110 (a radius of the reaction vessel 110), and is preferably from 14% to 24% of the distance. Note that, from the point of view of causing the flow from the outer side to the inner side in the vicinity of the boundary surface of the polymerization solution to occur more easily, the extending direction of the above described baffles 140 is preferably shorter than the distance between the vessel wall of the reaction vessel 110 and the heat transfer pipes 130.

The reactor 100 can also be applied to any polymerization reaction that performs a reaction in a liquid phase. In particular, even when the number of the heat transfer pipes 130 is increased in order to increase the heat removal performance when the polymerization solution is caused to be a high concentration or the like, the reactor 100 can sufficiently mix the polymerization solution that has become highly viscous, and can also prevent the adhesion of the reaction product to the stirring blade 120, the vessel wall of the reaction vessel 110 and the like. Furthermore, even when granulating and collecting the reaction product, such as the polymer, inside the reaction vessel 110, for example, the reactor 100 can prevent the adhesion of the particulate form reaction product to the stirring blade 120, the vessel wall of the reaction vessel 110, and the like.

For example, when producing a polyarylene sulfide (PAS) or the like, raw materials (paradichlorobenzene (p-DCB) as a monomer and sodium sulfide ($Na_2S$) when producing polyphenylene sulfide (PPS), for example), are heated in a polar solvent (such as N-methylpyrrolidone (NMP) or the like), and polymerization is performed in two stages. At this time, in the first stage, the prepolymer is produced such that a monomer conversion ratio is 90% or more, and in the second stage, a liquid-liquid phase separation state configured by a dense phase and a dilute phase of different polymer concentrations is caused to be expressed in the above described prepolymer having a high moisture content and a high temperature, the polymerization reaction is caused to progress in the above described dense phase, and the polymer is caused to have a high molecular weight. After that, the PAS is granulated by lowering a reaction temperature, and slurry is collected and sieved. As a result, the particulate form PAS can be obtained.

In the above described production of the PAS, when the monomer that is the raw material is caused to have a high concentration in order to increase the yield, in order to prevent a runaway reaction caused by the reaction heat that occurs in large quantities in the first stage, there is a demand to improve the heat removal performance of the reactor 100. In order to improve the heat removal performance, with respect to this, when the multiple heat transfer pipes having the hairpin coil shape and the reduced diameter are arranged in the circumferential shape in order to increase the heating surface area of the heat transfer pipes while maintaining the practical volume, the mixing of the polymerization solution is obstructed. This causes an insufficient polymerization to occur, and the polymer and causes the granulated particles that are the reaction products to more easily adhere to the stirring blade 120 and the vessel wall of the reaction vessel 110.

In contrast, in the reactor 100 according to the present embodiment, a deterioration in the mixing performance of the polymerization solution is prevented while increasing the number of heat transfer pipes, and therefore problems such as the above described insufficient polymerization and the adhesion of the polymer and the granulated particles that are the reaction products do not easily occur.

Note that the above described embodiment merely illustrates a specific example of embodying the present invention, and should not be interpreted to limit a technical range of the present invention. Specifically, the present invention can be embodied in various ways insofar as they do not depart from the gist and main features of the present invention.

Figure 5:
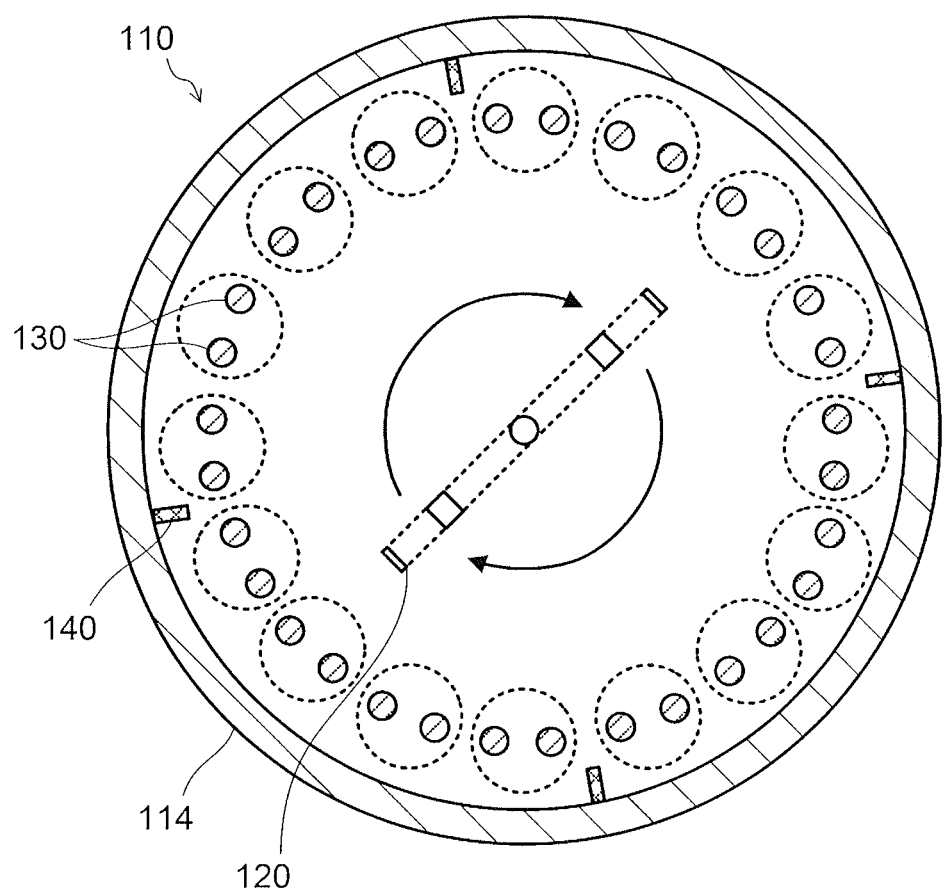
FIG. 5 is a cross-sectional view of the reactor according to another embodiment of the present invention, including the reaction vessel that has the substantially cylindrical shape and in which an arrangement of a plurality of heat transfer pipes that are heat transfer pipes having a hairpin coil shape is different, when cut in the horizontal direction along the dotted line A-A illustrated in FIG. 1.

For example, as illustrated in FIG. 2, in the above described embodiment, the plurality of heat transfer pipes that are the heat transfer pipes having the hairpin coil shape are arranged in positions in which distances and angles to each of the above described two coils configuring the hairpin coil shape from the center axis of the reaction vessel are different. However, as illustrated in FIG. 5, the above described heat transfer pipes may be arranged such that the distances to each of the above described two pipes from the center axis of the reaction vessel 110 are the same, but the angles are different. At this time, the above described plurality of heat transfer pipes are arranged such that both the above described two pipes configuring the hairpin coil shape are positioned on a circle centered on the center axis of the reaction vessel.

Furthermore, in the above described embodiment, the reaction vessel has a configuration in which the upper lid is opened and closed so as to remove the polymerization solution after the reaction, but may have a configuration in which a valve or a removal port is provided in a bottom portion of the reaction vessel and the polymer and other reaction products are removed from the bottom portion.

Furthermore, the above described plurality of heat transfer pipes may be configured such that, while being installed in the reactor, the positions thereof can be moved in the horizontal direction, and the gap between the adjacent heat transfer pipes is variable. In this way, when cleaning inside the vessel or the like, the gap between the heat transfer pipes can be widened, and cleaning of the vessel wall of the reaction vessel can be easily performed.

INDUSTRIAL APPLICABILITY

Even when the reaction raw material is caused to be a high concentration in order to increase the yield, for example, the reactor of the present embodiment can increase the mixing performance and can prevent insufficient polymerization and adhesion of the polymer, which is the reaction product, and the granulated particles, while sufficiently removing the heat from the polymerization and preventing the runaway reaction. Thus, the present invention can enable production of the polymer with a higher yield, and is expected to contribute to the development of this field.

REFERENCE SIGNS LIST

100 Reactor
110 Reaction vessel
112 Supply port
114 Jacket

120 Stirring blade
130 Heat transfer pipe
140 Baffle

The invention claimed is:

1. A manufacturing method for a reaction product comprising:
housing a polymerization solution in a reaction vessel in which a polymerization reaction is performed;
stirring the polymerization solution housed in the reaction vessel using a stirring blade;
transferring heat to the polymerization solution in order to start the polymerization reaction and cause the polymerization reaction to proceed, and to remove, from the polymerization solution, heat generated by the polymerization reaction using a plurality of heat transfer pipes, elongated to a depth direction of the vessel; wherein
the plurality of heat transfer pipes are arranged in a circumferential shape around the stirring blade, include a heat transfer pipe whose lower end is arranged in a position higher than a bottom face of the reaction vessel, and restrict an amount of the polymerization solution circulated from an inner side to a vessel wall side of the reaction vessel, at a depth at which the heat transfer pipes are arranged,
the polymerization solution is housed in the reaction vessel such that upper ends of the plurality of heat transfer pipes are arranged in positions lower than a liquid surface of the polymerization solution,
the method further comprising changing a flow direction of the polymerization solution that has flowed between the vessel wall of the reaction vessel and the heat transfer pipes arranged in the circumferential shape using a baffle arranged between a vessel wall of the reaction vessel and the heat transfer pipes, thereby generating a flow of the polymerization solution to an inward direction of the reaction vessel, and wherein
the polymerization solution immerses the baffle such that a length of a section of the baffle immersed in the polymerization solution is from 10% to 50% of a liquid level.

2. The manufacturing method for a reaction product according to claim 1, wherein
the baffle comprises a plurality of the baffles arranged so as to protrude from the vessel wall of the reaction vessel in the inward direction of the reaction vessel, and
the changing the flow direction comprises changing the flow direction of the polymerization solution that rises while revolving along the vessel wall of the reaction vessel using the plurality of the baffles.

3. The manufacturing method for a reaction product according to claim 1, wherein
the polymerization solution immerses the baffle such that an upper end of the baffle is higher than a position of a liquid surface and a lower end of the baffle is at a position lower than a position of the liquid surface.

4. The manufacturing method for a reaction product according to claim 1, wherein
the polymerization solution immerses the plurality of heat transfer pipes such that upper ends of the plurality of heat transfer pipes are at positions lower than a position of a liquid surface.

5. The manufacturing method for a reaction product according to claim 1, wherein
a distance between lower ends of the plurality of heat transfer pipes and the bottom face of the reaction vessel is longer than a distance between the plurality of heat transfer pipes and the vessel wall of the reaction vessel.

6. The manufacturing method for a reaction product according to claim 1, wherein
the plurality of heat transfer pipes have a hairpin coil shape in which ends of two pipes that are arranged in a vertical direction are coupled together.

7. The manufacturing method for a reaction product according to claim 6, wherein
the plurality of heat transfer pipes having the hairpin coil shape are arranged in positions in which distances and angles from a center axis of the reaction vessel to each of the two pipes are different.

8. The manufacturing method for a reaction product according to claim 1, wherein
the polymerization solution contains one of a raw material of polyarylene sulfide and polyarylene sulfide produced from the raw material.

* * * * *